Patented Aug. 19, 1924.

1,505,340

UNITED STATES PATENT OFFICE.

JOHN HARRIS, OF LAKEWOOD, OHIO, ASSIGNOR TO CARBO-OXYGEN COMPANY, OF CLEVELAND, OHIO, A CORPORATION OF DELAWARE.

GASEOUS FUEL.

No Drawing.     Application filed January 5, 1920. Serial No. 349,587.

*To all whom it may concern:*

Be it known that I, JOHN HARRIS, a citizen of the United States, residing at Lakewood, in the county of Cuyahoga and State of Ohio, have invented a certain new and useful Improvement in Gaseous Fuel, of which the following is a full, clear, and exact description.

This invention relates to gaseous fuel capable of use for the purpose of cutting and welding as well as for heating large plates or masses of metal for the shaping thereof.

The gaseous fuel covered hereby consists of a mixture of acetylene with hydrogen in the proportions of 20% to 40% by volume of the acetylene to 80% to 60% by volume of hydrogen.

It has been proposed to employ hydrogen alone as the combustible gas in connection with blow-pipes, but the use of this gas for the cutting and welding art is attended with the disadvantage of its great intensity of combustion, which concentrates the flame into a very small space. A further disadvantage in the use of hydrogen alone for this purpose is that all parts of the flame produced by the combustion thereof are colorless, rendering it practically impossible to adjust the flame properly with reference to the work as well as with reference to the oxygen admitted for the purpose of supporting its combustion.

By mixing acetylene with the hydrogen, in about the proportions specified, the heat units developed by the combustion of the mixture and the flame temperature are greater than produced by the combustion of hydrogen alone. Furthermore, a visible cone is produced within the flame which enables the operator to adjust the proportions of the gases and the combustion-supporting oxygen and to apply the flame in the most favorable manner to the work. This increase in heat units and flame temperature also renders my gaseous fuel particularly useful in preheating large masses of metal such as castings, since it compensates for the loss of heat due to the conductivity of such masses. Even at the lower limit (20%) the acetylene will compensate by reason of the increase in heat units over hydrogen alone, for the loss of heat by conduction in metal of considerably greater mass than possessed by the plates with which blowpipes are ordinarily employed, while at its upper limit (40%), it will compensate for such loss in practically any mass of metal.

My gaseous fuel is intended to supply a field for the cutting, welding, heating and shaping of plates, castings and alloy steels as well as other forms of iron and steel products which, according to analysis, require a greater or less degree of heat units in the gas to give the desired result and increase the flame temperature over that of hydrogen alone with a minimum requirement of oxygen for combustion.

I have found that by mixing acetylene with hydrogen in the proportion of approximately 40% by volume of acetylene to the hydrogen, a gas is produced which is ideal for cutting and welding heavy masses of metal, such as castings. This proportion of acetylene insures the proper preheating of the metal whereby the cutting and welding may be accomplished without great loss of efficiency due to conductivity of the heat by the large mass of metal. The presence of acetylene in this proportion insures sufficient flame volume and heat units, over those produced by a combustion of hydrogen alone, to secure efficient cutting and welding under the conditions noted. Furthermore, by not materially exceeding the proportion of 40% of acetylene, the carbonization of the metal in welding operations is avoided.

Having thus described my invention, what I claim is:—

1. A gas for cutting, welding and heating purposes comprising a mixture of acetylene and hydrogen in the proportions of from 20% to 40% by volume of acetylene to 80% to 60% by volume of hydrogen.

2. A gas for cutting, welding and heating purposes comprising a mixture of acetylene with hydrogen in the proportions of approximately 40% by volume of acetylene to the hydrogen.

In testimony whereof, I hereunto affix my signature.

JOHN HARRIS.